Jan. 5, 1954  W. WIEBE  2,664,691
APPARATUS FOR PICKING-UP PRUNES AND THE LIKE
Filed Aug. 4, 1950  4 Sheets-Sheet 1

INVENTOR:
Walter Wiebe
By: Leslie M. Hansen
HIS ATTORNEY.

Walter Wiebe
INVENTOR
By: Leslie M. Hansen
HIS ATTORNEY.

Jan. 5, 1954  W. WIEBE  2,664,691
APPARATUS FOR PICKING-UP PRUNES AND THE LIKE
Filed Aug. 4, 1950  4 Sheets-Sheet 3
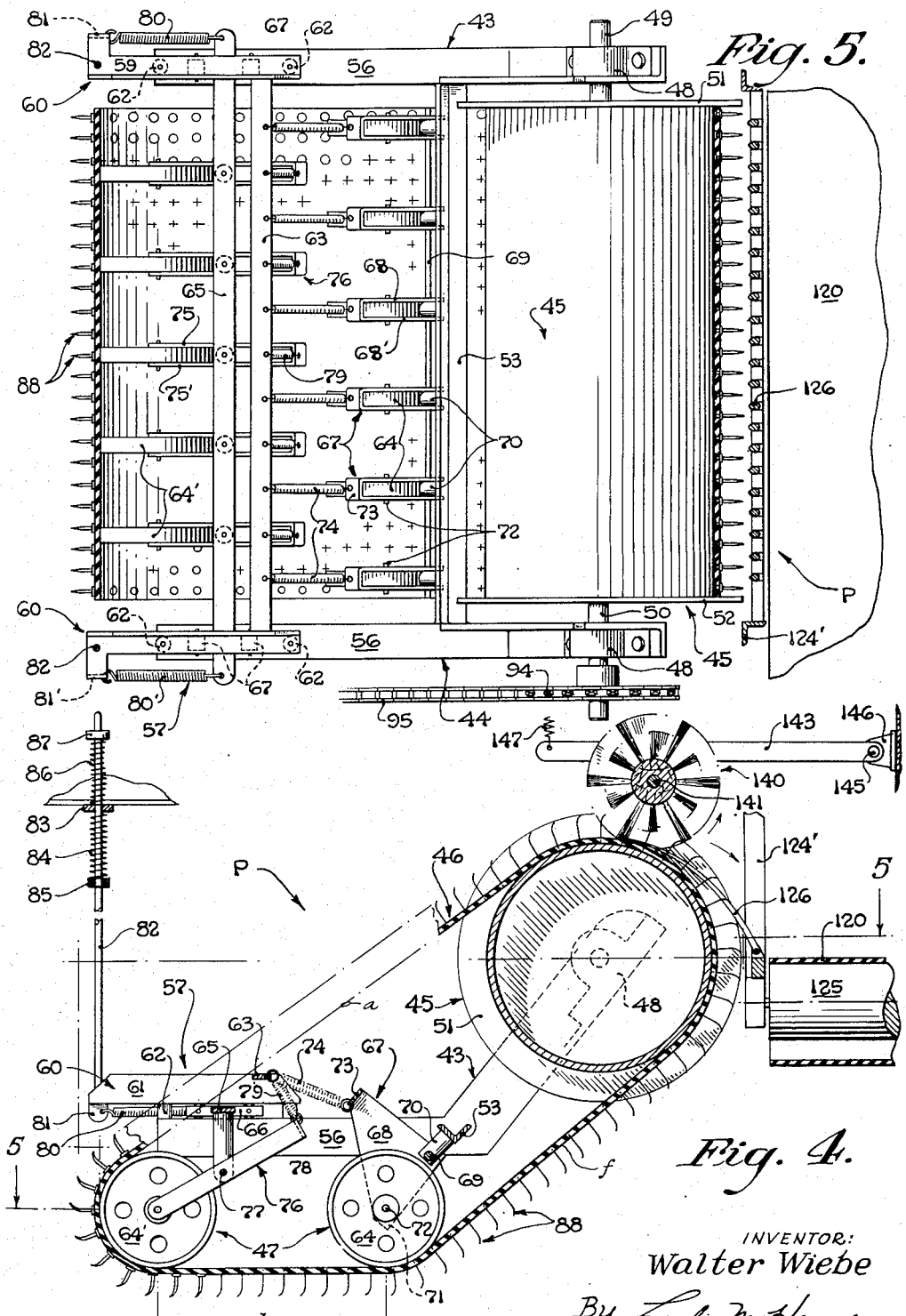
INVENTOR:
Walter Wiebe
By Leslie M. Hansen
HIS ATTORNEY.

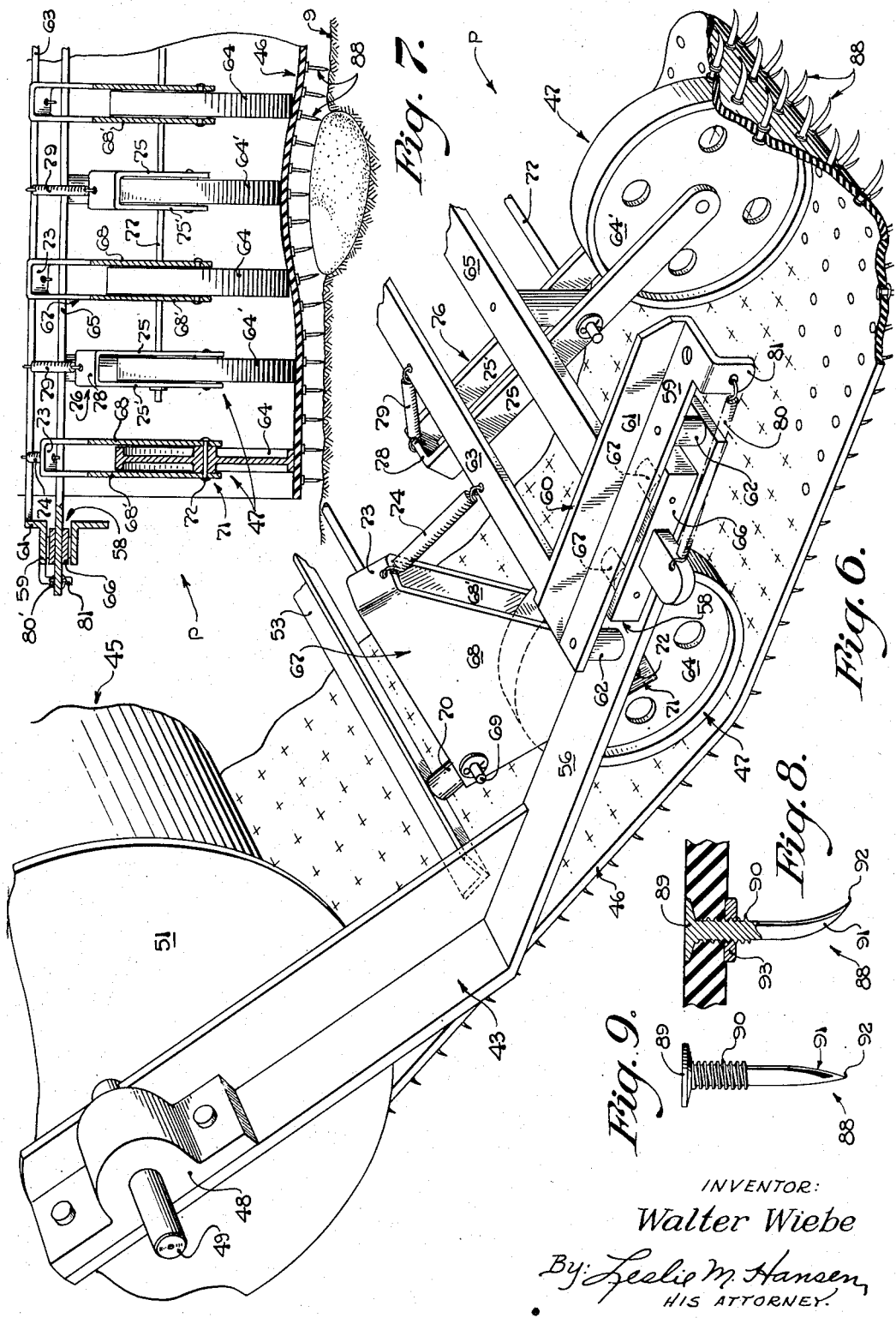

Patented Jan. 5, 1954

2,664,691

UNITED STATES PATENT OFFICE 2,664,691

APPARATUS FOR PICKING UP PRUNES AND THE LIKE

Walter Wiebe, Hollister, Calif.

Application August 4, 1950, Serial No. 177,632

14 Claims. (Cl. 56—328)

This invention relates to fruit gatherers and more particularly to apparatus for picking up from the ground fruit, such as prunes, nuts and the like for conveyance into receptacles.

In the art of picking prunes and nuts the common practice is to shake the trees after which the fruit is picked up by hand and placed in boxes. Various forms of apparatus have been contrived to eliminate hand picking by the use of devices for lifting the fruit from the ground for conveyance to a discharge station. When mechanical pickers are employed it is desirable to have the earth rolled or flattened prior to shaking the fruit from the trees. While in theory it is best to have the earth smooth and flat it is hardly ever possible to avoid having rocks, roots and the like protruding above surface or to avoid depressions caused by removed boulders or by foot prints made by persons crossing the orchard.

The present invention has as one of its objects the provision of an apparatus in which the actual picking element hugs the earth regardless of irregularities therein.

Another object is to provide an apparatus having a pick-up carriage spanning the area under the boughs on one side of a tree for picking up all the fruit at one side of a tree or a row of trees in a single trip past the same.

Another object is to provide a self-propelled apparatus with a plurality of pick-up units arranged in staggered relation so as to pick up fruit throughout the entire span of the apparatus.

Still another object is to provide a pick-up carriage so related to the propelling means of the apparatus as to enable travel thereof with the pick-up units out of operating position.

Yet another object is to provide individual pick-up units capable of picking up all fruit in their respective paths in the course of movement of such units over such fruit.

A further object is to provide an improved pick-up unit driven in unison with the speed of the apparatus over the earth so as to merely engage fruit, impale it and then lift it from the earth with a minimum amount of shifting of the fruit relative to the earth.

A still further object is to provide a yieldable continuous belt having a multitude of impaling means thereon spaced from each other a distance assuring actual contact thereof with any fruit in the path of the apparatus.

Another and further object is to provide a self-operating tensioning means for the continuous belt previously mentioned for allowing the latter to yield and stretch out in conformity with irregularities in the surface over which it travels.

Another object is to provide yieldable and automatic means for lengthening or shortening the earth engaging reach of the pick-up belt to suit the circumstances.

Another object is to provide means for varying the pressure at which the pick-up units engage the fruit being picked up to facilitate handling of such fruit regardless of variations in its state of ripeness.

Another object is to provide novel means for stripping the impaled fruit from the pick-up means with a minimum of injury to the edible portion of such fruit.

These and other objects and advantages will become apparent from the following description when read in the light of the drawings in which:

Fig. 4 is an enlarged central longitudinal section through one pick-up unit and showing related parts of the apparatus embodying the same.

Fig. 5 is a section of Fig. 4 taken substantially along line 5—5 thereof.

Fig. 6 is a fragmentary perspective view of the pick-up unit shown in Figs. 4 and 5 with parts broken away and shown in section.

Fig. 7 is a fragmentary vertical section of Fig. 4 taken through the center of wheels 64.

Fig. 8 is an enlarged elevational view of the pick-up with a portion thereof broken away and shown in section.

Fig. 9 is an elevation of a pick-up pin only as seen from its leading side.

Figure 1:
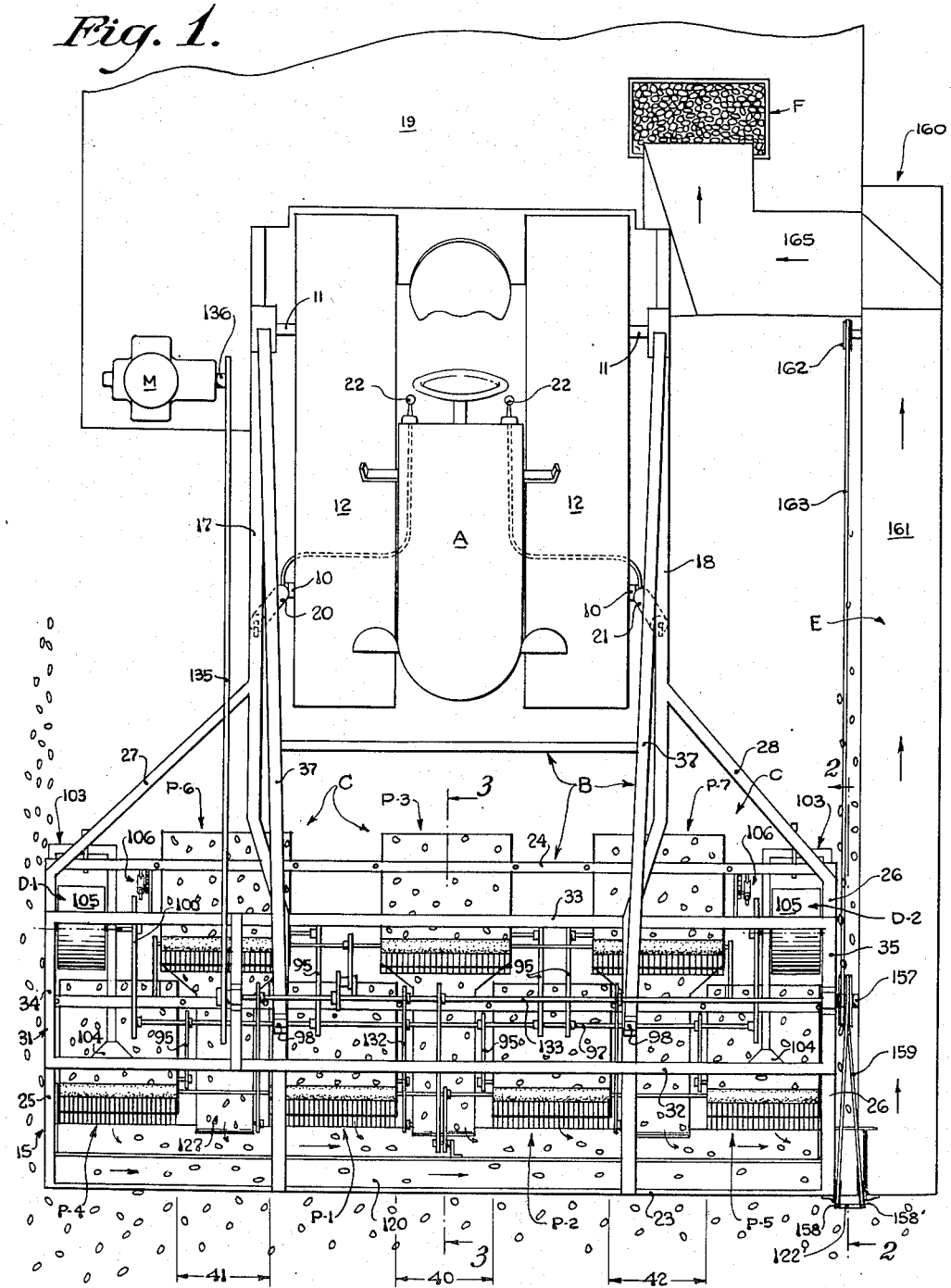
Fig. 1 is a fragmentary top view of an apparatus embodying the present invention.

The device of the present invention as depicted in Fig. 1 generally comprises a prime mover in the form of a tractor A; a carriage B supported by said tractor for movement therewith and for movement relative thereto; a pick-up unit C on said carriage; traction means D for driving said pick-up unit; an auxiliary motor M for said pick-up unit; conveyor means E for receiving fruit from the pick-up unit and for discharging such fruit into receptacles F disposed at the discharge end of the conveying means.

The tractor A may be of any well known form suitable for travel over loose earth such as is found on farms and in orchards. In the present disclosure the tractor A is of the caterpillar type having a front axle 10 and a rear axle 11 each carrying the usual cog wheels upon which endless treads 12 are mounted at the sides of the tractor.

The carriage B comprises a frame 15 of rectangular form from which a pair of shafts, in the form of truss-like arms 17 and 18, extend rearwardly in spaced relation to recive the tractor A. The arms 17 and 18 are pivotally connected to the rear axle 11 of the tractor and extend rearwardly thereof to support a platform 19. The arrangement is such that the entire carriage with the platform is rockably mounted on the tractor in counterbalanced fashion, the major weight being on the fore part or frame 15 of the carriage so that the latter tends to gravitate toward the earth.

Pistons 20 and 21 are provided at either side of the tractor, preferably between the front axle 10 and the respective arms 17 and 18 to hold the carriage in predetermined positions relative to the tractor. These pistons are embodied in a hydraulic system of well known design and operate in the conventional manner under the control of levers 22 located at the driver's station of the tractor.

Figure 2:
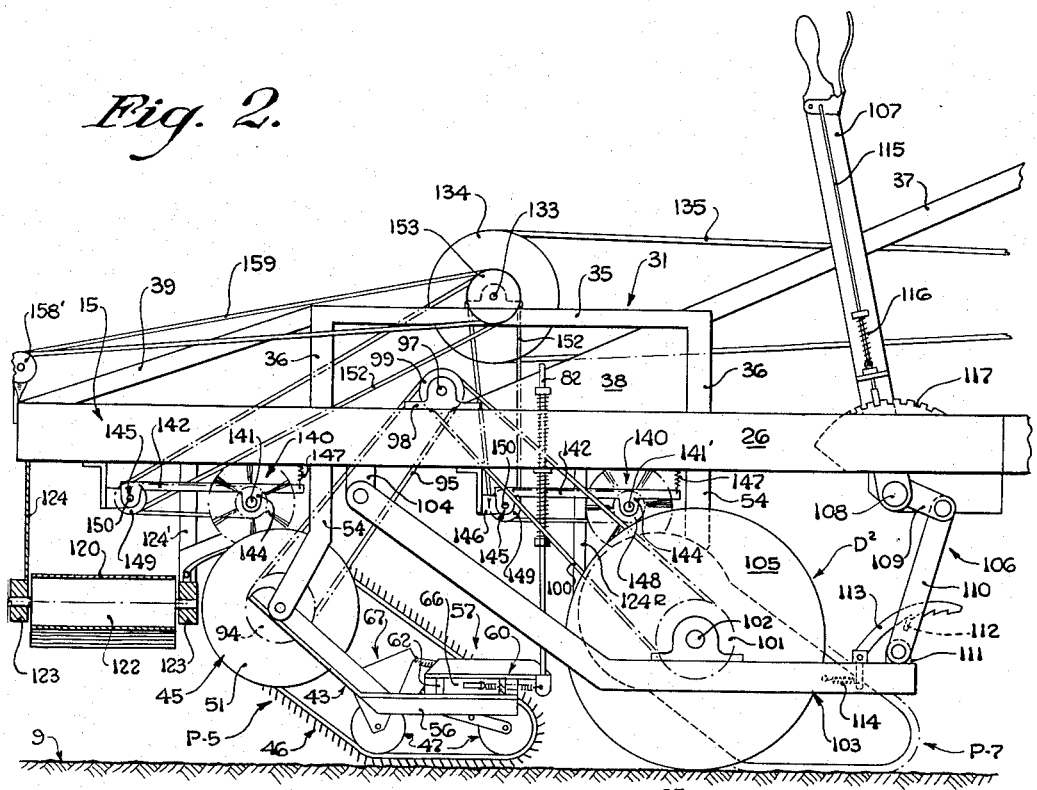
Fig. 2 is a vertical section of Fig. 1 taken along line 2—2 thereof.
Figure 3:
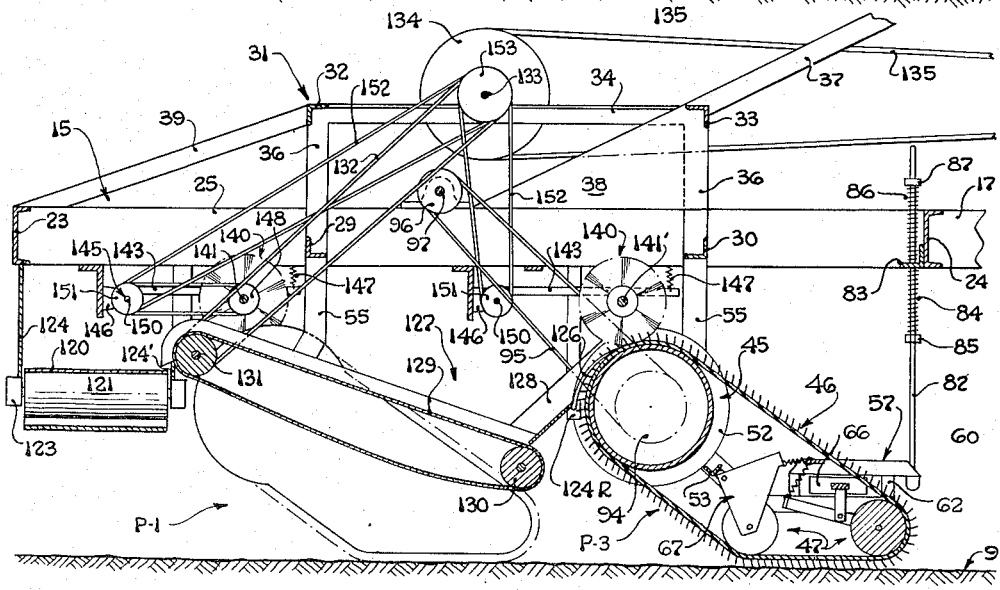
Fig. 3 is a vertical section of Fig. 1 taken along line 3—3 thereof.

The frame 15, Figs. 2 and 3, is an open framework of structural steel members including fore and aft channels 23 and 24 connected to side channels 25 and 26, the latter of which are joined by diagonal brace portions 27 and 28 to the respective arms 17 and 18 as seen in Fig. 1. The arms 17 and 18, although offset slightly, continue through from the aft to the fore channels to which they are secured or welded. Intermediate structural members 29 and 30, in the form of angle irons, extend parallel to the fore and aft channels and are so spaced therefrom (see Fig. 3) as to provide a base for an upstanding central frame 31.

This central frame 31 is made up of angle irons including a front one 32 and a rear one 33 joined at their ends by side angles 34 and 35 supported by uprights 36 secured to the base formed by the intermediate members 29 and 30. The upper part 37 of each truss-like arm 17 and 18 is secured to the rear angle iron 33 of the central frame and extends obliquely downwardly to merge with the lower part 38 of the respective arm 17 or 18. The front angle iron 31 of the central frame 31 is braced by obliquely disposed angle irons 39 secured to the fore channel 23 in alignment with the truss-like arms 17 and 18.

The pick-up unit C in the present disclosure comprises a plurality of individual units P, each of which is identical in construction. Consequently, like reference numerals are applied to like parts on each separate unit P. Any number of such separate units may be employed and even one single unit, large enough to extend the entire length of the frame 15, can be used. For purposes of this application two units, P1 and P2, placed between and adjacent the respective arms 17 and 18, are of such width as to leave a space 40 between such units. Another unit P3 is placed rearwardly of the first two units along the longitudinal axis of the tractor to pick up all fruit lying between the first two units P1 and P2. A unit P4 placed adjacent the end wall 25 of frame 15 and another unit P5 adjacent end wall 26 of the frame, in alignment with the first two units mentioned above, leave a space 41 between units P1 and P4 and a similar space 42 between units P2 and P5. Units P6 and P7 arranged in alignment with the aforementioned rearmost unit P3 are disposed to pick up fruit left at spaces 41 and 42 respectively.

From the foregoing and with reference to Fig. 1 it is apparent that the several units P1 to 7 are in staggered relation so as to completely cover the surface of the earth immediately ahead of the tractor A.

Each unit P, Figs. 4 through 9, comprises a pair of arms 43—44 spaced from each other to receive a drum 45 between them, around which drum a flexible web or endless belt 46 is trained. The belt 46 extends rearwardly of the drum where it is held at proper tension by an automatic tensioner 47 so as to adequately spread over and engage a sufficient area of the earth's surface to contact fruit thereon.

The forward ends of the arms 43—44 are turned upwardly and each have a suitable bearing boss 48 thereon for rotatably supporting spindles 49 and 50 extending axially from the drum 45. The spindles 49—50 are secured to respective end discs 51 and 52 extending beyond the periphery of the drum 45 to properly guide the belt 46 around the same.

Immediately to the rear of the drum 45 the arms 43—44 are united by a forward crossbar 53. The spindles 49—50 of each unit extend through supporting brackets 54 and 55 on either side of each unit and these brackets 54—55 extend downwardly from the frame 15 as best seen in Figs. 2 and 3. In the case of the forwardly disposed units P1, 2, 4 and 5, the brackets 54—55 extend from the foremost intermediate member 29 of the frame 15 while the brackets for the rearwardly disposed units P3, 6 and 7 extend from the rearmost intermediate member 30 of the frame. In each case the brackets 54—55 have a forwardly tending terminus to withstand the normal thrust occasioned by the load on each unit. In this manner the drum of each unit is supported a predetermined distance beneath the frame 15 and well above the surface 9 of the earth over which the units are to move. However, the endless belt 46 of each unit is stretched and guided in such a fashion as to cause a predetermined area L or the lower reach thereof to travel horizontally of and over the earth.

For accomplishing the foregoing each arm 43—44 has a rearwardly extending horizontally disposed portion 56 to which a rearward framework 57 is secured. This framework includes a guideway 58 on the portion 56 of each arm 43—44, provided by base flanges 59 of angle irons 60, the upstanding flanges 61 of which are disposed inwardly of the unit P. The base flange 59 is secured at either of its ends to the portion 56 of the respective arm 43—44 by rivets having spacers 62 between the flange 59 and the portion 56.

These flanges 61 on each side of the unit are joined by a medial crossbar 63 disposed substantially midway and above the horizontal lower reach L of the endless belt 46.

The endless belt 46 is guided by the tensioner 47 which includes two groups of wheels 64 and 64', one group 64 being supported on the forward crossbar 53, the other group 64' being supported on a floating crossbar 65 having its ends extending through blocks 66 slidable in the guideways 58 on the rearward portion 56 of arms 43—33. The blocks 66 have rollers 66' mounted therein so that the rollers ride upon the portion 56 of arm 43 or 44 as the case may be.

As best seen in Fig. 6 the wheels 64 in the forward group thereof are each supported for rotation within a U-shaped arm 67 having triangularly shaped legs 68—68'. This arm 67 is pivotally mounted adjacent its base angle on a rod 69 extending through a stud 70 secured to the forward crossbar 53. The lower corners 71 of these triangular legs 68—68' support the axle 72 for a wheel 64, the opposite corners of the legs being joined by the bight portion 73 of the U-shaped arm to form an anchor for a spring 74 having its opposite end secured by the medial crossbar 63. The arrangement is such that the spring 74 constantly urges the arm 67 and the wheel 64 supported thereby counterclockwise (Fig. 4) to thereby establish the forward extremity of the horizontal lower reach L of the belt 46.

The rearward group of wheels 64' are similarly supported for rotation between the ends of the arms 75—75' of a U-strap 76 rockably mounted midway the arms 75—75' on a pivot rod 77 inserted transversely of the lower ends of a plurality of studs 77' extending downwardly from the floating crossbar 65. The bight portion 78 of U-strap 76 has a spring 79 secured to it, the opposite end of spring 79 being anchored to the medial crossbar 63 so as to urge the rearward group of wheels toward the earth. Thus the rearward group of wheels 64' establish the rearward extremity of the horizontal lower reach L of the belt 46. In this manner the belt 46 is so guided as to provide a substantial, flat earth engaging portion (lower reach L) as distinguished from a single line contact with the earth as would be effected were the belt trained over a single roller; that is, as distinguished from mere tangential contact of the belt with the earth.

The length of the earth engaging reach L of the belt is preferably about eight inches from front to rear. This length can be varied as desired by a change in belt size. However, the reach L becomes longer also when the frame 15 is raised from the earth in a manner later to be explained. In this connection it will be noted in Fig. 4 that both forward and rear groups of wheels 64 and 64' will be urged counterclockwise by their springs 74 and 79, thus decreasing the length of the fore and aft spans f and a (Fig. 4) of the belt 46. However, since the rearward group of wheels 64' are shiftable with the floating cross bar 65 any play in the belt 46 is thereby taken up with a resultant lengthening of the earth engaging reach L. When the frame 15 is lowered the reach L becomes shorter and engages the earth with greater pressure than when the reach L was longer.

The floating crossbar 65 is constantly urged rearwardly by a pair of springs 80 and 80' secured to the respective ends of cross bar 65 extending outwardly from the blocks 66 which ride in the guideways 58. The opposite ends of the springs 80—80' are anchored to corresponding ears 81 and 81' formed on the rear extremity of the respective angle irons 60 as shown in Figs. 4 through 7.

The rear extremity of each angle iron 60 is constantly urged downwardly toward the earth, regardless of the elevation of the frame 15, by spring balanced rods 82, Figs. 2, 3 and 4. A rod 82 is secured to the end of each angle iron 60 so as to extend upwardly therefrom, the upper end of each rod 82 extending through a fixed guide 83 formed on and carried by the frame 15. The rod 82 slides freely through the guide 83 and a compression spring 84 encircling the rod below the guide 83 tends to urge the rod downwardly, there being an adjustable collar 85 secured to the rod 82 beneath the spring 84 to maintain the rod under a proper load for pressing the rearward ends of the arms 43—44 downwardly toward the earth.

A similar compression spring 86 encircles the upper end of the rod 82 and is held in proper pressure against the guide 83 by an adjustable collar 87 secured to the rod. This upper spring 86 serves as a buffer or shock absorber and to prevent the earth engaging reach L of belt 46 from rebounding against the earth with too great a force.

As illustrated in Figs. 4 through 9 the belt 46 carries a plurality of fruit impaling pins 88 arranged in a uniform pattern on the belt so that one or another of these pins is bound to pierce a prune as the pins turn about the periphery of the forward group of wheels 64.

Each pin 88 comprises a hardened steel spike having a head 89, a threaded shank 90 adjacent the head, and a curved or arcuate end 91 terminating in a point 92. Each pin is inserted through the belt 46 from the inner surface thereof so that the head 89 bears against such inner surface. A nut 93 applied to the threaded shank 90 bears against the outer surface of the belt 46 to thereby secure the pin firmly to the belt. Each pin 88 is disposed with its curved end 91 facing in the general direction of the movement of the belt 46 so that as the belt turns about the forward group of wheels 64 the pin travels substantially axially into any fruit lying in its way. Moreover, as each transverse row of pins 88 begins to turn from earth engaging position upwardly and around the rearward group of wheels 64', the arcuate ends of the pins tend to become upturned to thereby hold the fruit impaled thereon and to assure against such fruit slipping off of the pins.

It should here be understood that the speed at which the belt 46 travels past the wheels 64 is equal to the speed of the entire unit relative to the earth. Consequently, there is no relative movement between the pins and the earth along the lower reach L of the pickup belt. In other words, as each transverse row of pins rounds the forward group of wheels 64 to impale fruit, the pins remain substantially in the same position relative to the surface of the earth until the axes of the rearward group of wheels 64' arrive vertically above such transverse row of pins, whereupon the latter turn upwardly in travelling around the rearward group of wheels.

For driving the belts 46 at the aforementioned speed, a sprocket 94, secured to either spindle 49 or 50 of each unit P, is associated with a separate chain 95 trained around a separate drive sprocket 96, there being several sprockets 96 secured to a countershaft 97. The countershaft 97 is journaled for rotation in bearings 98 suitably secured to the frame 15 and has sprockets 99 secured to it. A drive chain 100, trained around sprocket 99, is also trained around a sprocket 101 secured to a shaft 102 forming a part of the traction means D, hereinbefore mentioned.

In the present disclosure the traction means D comprises two earth engaging units D1 and D2, one being adjacent side channel 25 and the other adjacent side channel 26 as best seen in Fig. 1. These units D1 and D2 being identical, description of one will suffice, it being understood that they differ only insofar as necessary to adapt them to the left or right side of the frame 15 as the case may be.

The shaft 102 of each traction means is journaled in bearings secured to the legs of a separate U-shaped frame 103. The legs of each unit D1 and 2 are turned upwardly at their free ends and are pivotally connected to suitable brackets 104 secured to the frame 15. In each unit D1 and 2 a large traction roller 105 is secured to the shaft 102 and rests upon the earth so as to turn at a proper speed upon engagement therewith for turning the shaft 102 and sprocket 101. In this manner motion is transmitted by way of chains 100 to the countershaft 97 to thereby drive the drums 45 of all of the pick-up units at a speed commensurate with the rate of movement of the tractor A.

Since the frame 103 of each traction unit D1 and D2 is pivotally connected to the frame 15, means 106 is provided for supporting such frames 103 relatively stationary with respect to the main frame 15. This means 106, in each instance, comprises a lever 107 pivotally mounted as at 108 to an appendage on the frame 15, a bell crank 109 associated with the lever 107, and a connecting link 110 pivotally connected to the bell crank and to an ear 111 arranged on the bight portion of the particular U frame 103. The link 110 has an integral lug 112 disposed to be engaged by a toothed edge of a latch arm 113 pivotally connected to the U-frame 103 and normally urged by a spring 114 in a direction to keep the toothed edge in contact with the lug 112. In this manner the U-frame 103 is adapted to be latched in various angular positions relative to the main frame 15 to thereby raise or lower the latter for purposes of changing the earth engaging area and pressure of the reach L of belt 46 as hereinbefore explained.

In addition to the foregoing means for latching the U frames 103 relative to the main frame 15, each lever 107 is provided with a hand actuated release rod 115 normally urged by a spring 116 into locking engagement with one or another recess in a serrated edge 117 of the appendage upon which the lever 107 is mounted. Consequently, when it is desired to change the elevation of the main frame with respect to horizontal the hand grip on lever 107 is grasped to release the rod 115 from engagement with a particular recess on edge 117. Thus the latch arm 113 alone locks the U-frame 103 in position. However, upon manual movement of the lever 107 slightly clockwise (Fig. 2) the latch arm 113 can be raised to allow further swing of lever 107 and link 110. When desired angular disposition between frames 15 and 103 is attained, the rod 115 is released for action by its spring 116 to engage in the particular recess of edge 117 opposite the end of rod 115. Thereafter, the latch arm 113 again is disposed to hold the link 110 incident to future manipulation of the lever 107.

As best shown in Figs. 1 and 2, each of the forwardly disposed pick-up units P (1, 2, 4 and 5) is positioned with its drum 45 adjacent a transverse portion of the conveyor means E. This portion of the conveyor means comprises a belt 120 trained around rolls 121 and 122 suitably journaled in bearings 123 supported by spaced structural members 124 and 124' suspended from the fore part of the main frame 15. The roll 121 is disposed adjacent and parallel to the side channel 25 and is freely rotatable in its bearings 123. The roll 122 is disposed in a like position adjacent the side channel 26. The rolls 121—122 are a fixed distance below the frame 15 so that the upper reach of the belt 120 is positioned to receive fruit from the drums 45 of the forward units P as the belts 46 begin to descend around the same. The upper reach of belt 120 is maintained horizontal by intermediate rolls 125 journaled in bearings carried by the aforementioned structural members 124—124'.

Fruit stripping means is provided in the form of a plurality of tines 126 secured to the member 124' adjacent the forward units P, the free ends of the tines extending more or less tangentially relative to the periphery of belt 46 as it descends around the drum 45. As seen in Fig. 5, one such tine 126 extends between each forwardly moving line of pins 88 on the belt 46 and the tines are disposed at an incline, Fig. 4, so that the fruit impaled on the pins 88 is stripped from the pins for gravitation over the tines and onto the upper reach of the conveyor belt 120.

The rearwardly disposed pick-up units P (3, 6 and 7) are also provided with stripping tines 126 but since the drums 45 of these rearward units are somewhat to the rear of the conveyor belt 120, an auxiliary conveyor 127 is provided, see Fig. 3. In this connection the tines 126 extend from a structural member 124R suitably suspended from the main frame 15, which member 124R carries a chute 128 discharging onto the upper reach of a belt 129. The belt 129 is trained around a rear roll 130 and a front roll 131, the rear one being journaled in bearings secured to the sides of the chute 128 while the front roll 131 is journaled in bearings secured to the structural member 124' adjacent the conveyor belt 120.

The front roll 131 of each conveyor 127 is drivingly connected by a sheave and belt 132 to an overhead shaft 133 suitably journaled in bearings mounted on the top of the central frame 31. This shaft 133 also carries a large sheave 134 driven by a belt 135 trained around a pulley 136 secured to the drive shaft of the auxiliary motor M, see Figs. 1 and 2. In this manner the auxiliary conveyors 127 are constantly driven to convey the fruit from the rearwardly disposed pick-up units to the upper reach of the transverse conveyor belt 120.

To further facilitate and assure removal and discharge of fruit from the pins 88, each unit P is provided with a rotary brush 140 (Figs. 1 to 4). The brushes for the forwardly disposed units are mounted on a common shaft 141 and those for the rearwardly disposed units P are mounted on another common shaft 141'. In either case each brush 140 is disposed with its lower periphery adapted to sweep over the respective belt 46 at its point of tangent relation with the free ends of the respective stripping tines 126.

The shafts 141—141' are each similarly supported for effecting light engagement of the brushes 140 with belts 46. This is accomplished by arms 142 at either end of the respective shaft 141 or 141' and an intermediate arm 143 somewhere midway the ends of such shafts. Each arm carries a suitable bearing 144 for shaft 141 or 141' near its free end and has its opposite end pivotally mounted as at 145 to a bracket 146 secured to the frame 15 forwardly of the brushes. The free ends of the arms 142, 143 are suspended by a spring 147 having its upper end suitably anchored to the frame 15. The springs 147 are so tensioned as to allow the brushes to weigh down upon the belts 46 sufficiently to sweep fruit from the pins 88 with a minimum amount of friction occuring between the brushes and the belts 46.

Each intermediate arm 143 has a belt and pulley system adjacent it, one pulley 148 being secured to the particular shaft 141 or 141' and the other pulley 149 being secured to a stud shaft 150 carried by bracket 146 concentric with the pivotal mounting 145 of the arm 143. In this manner vertical swinging of the arm 143 is permitted while the pulley 149 remains relatively fixed for rotation on the stud shaft 150. The stud shaft 150 carries another pulley 151 around which a belt 152 is trained for drivingly connecting pulley 151 to a pulley 153 on the overhead shaft 133.

From the foregoing it will be apparent that the brushes 140 are constantly rotated in a direction (see arrows Fig. 4) to sweep fruit axially from the pins 88 and tangentially from the belt 46 for gravitation over the inclined stripping tines 126. The bristles of the brushes are sufficiently limber to prevent them from tearing the fruit from the pins 88 as they begin their downward travel over the upper fore quadrant of the drum 45. Thus all of the fruit is completely removed from the pick-up units for ultimate discharge onto the upper reach of the transverse conveyor belt 120.

The belt 120 is driven by the overhead shaft 133 as best seen in Figs. 1 and 2. For this purpose a pulley 157 is secured to the end of overhead shaft 133 extending beyond the side 26 of the frame 15 and a set of pulleys 158—158' are mounted on brackets secured to the fore channel 23 above the roll 122. The shaft for roll 122 carries a pulley 122' disposed beneath pulleys 158—158' so that a belt 159 trained around pulley 157, guided over pulley 158, under pulley 122', and up and over pulley 158', transmits continuous motion from the overhead shaft 133 to the transverse conveyor belt 120. Consequently, fruit on the upper reach of belt 120 is moved from left to right as seen in Fig. 1 for discharge into the lower end of an inclined portion of the conveyor means E.

The inclined portion of the conveyor means E consists of a common elevator structure 160 in which an endless web 161 trained around lower and upper rollers (not shown) transport the fruit to the upper end of the elevator 160. As illustrated in Fig. 1 a pulley 162 operatively associated with the upper roller of elevator 160 is driven by a belt 163 trained over an available groove or sheave in the aforementioned pulley 157 secured to the end of the overhead shaft 133.

The fruit discharging from the upper end of the elevator 160 falls into a chute 165 for discharge into the receptacles F. These receptacles may be in the form of lug boxes placed at the end of the chute 165 and supported on the platform 19, hereinbefore mentioned.

*Operation*

In summary, the device of the present invention, when transported to and from an orchard, is conditioned with the entire carriage B including the traction means D elevated above the earth by actuation of the pistons 20 and 21 of the hydraulic system. In this condition the trailing ends of the pick-up units are held up by the spring balanced rods 82 and the only engagement with earth is by the treads 12 of the tractor A by which the apparatus is movable over the earth.

When the apparatus is driven into proper position at one end of an orchard the levers 22 of the hydraulic system are manipulated to release the pistons 20 and 21 for lowering the fore part of the carriage B whereupon the main frame 15 becomes supported by the traction rollers 105. The individual pick-up units P (1 to 7) then engage the earth at a degree of pressure determined by the setting of the latch means 106 by which the angular disposition between the main frame 15 and the traction units D1 and D2 is varied.

The lower or earth engaging reach L of the pick-up belts 46 are now disposed with their pins 88 engaging earth at sufficient pressure to impale fruit. The auxiliary motor M is then started to drive the overhead shaft 133 to constantly drive the brushes 140, auxiliary conveyors 127, and the transverse conveyor belt 120, as well as the inclined portion 160 of the conveyor means E.

As the tractor A is now driven forwardly each of the rollers 105 of the traction means D is turned by their engagement with the earth. In this manner the countershaft 97 is turned to drive the individual pick-up units P (1 through 7).

The belts 46 of the individual pick-up units travel at a speed commensurate with the speed of movement of the entire apparatus over the earth. Consequently, as the belts 46 travel over their respective drums 45 and tension wheels 64 the transverse rows of pins 88 throughout the length of the reach L are laid down upon the earth in sequence so as to be relatively immobile with respect to the earth. Since the pins are arcuate and pointed in a rearward direction, on the lower reaches of the belt 46, they tend to move axially into any fruit in their way as the pins turn from the fore reach $f$ to the earth engaging reach L. Once the pins extend vertically from the reach L the fruit impaled by the pins are fully pierced but since there is no relative movement between the pins and the earth the impaled fruit remains substantially stationary.

Should there be any boulders or obstructions, such as the one shown in Fig. 7, extending above the surface 9 of the earth the belt 46 will yield in the manner as illustrated while the balance of the earth engaging reach L of the belt 46 is fully pliable and tends to hug the surface of the earth regardless of any irregularities in the surface 9 of the earth.

In connection with the foregoing the belt 46 will also conform to any ruts or depressions in the surface of the earth. In other words, should fruit become lodged in such depressions the belt 46, being made of elastic material such as rubber, readily stretches under the influence of a particular tensioning wheel 64. In this manner the pins 88 in the portion of the belt stretched downwardly into depressions in the earth effectively pierce the fruit lodged in the depressions in the same manner as in the case of level ground.

From the foregoing it will be apparent that all of the fruit pierced by the pins 88 is adequately impaled to be lifted from the earth when each transverse row of pins begin to turn about the rearward set of wheels 64'. As soon as the axis of the rear set of wheels pass vertically above a transverse row of pins such pins, en bank, immediately begin to swing upwardly, their pointed ends 92 leading, to thereby assure against removal of the fruit from the pins. Once the transverse row of pins begins the straight run of the aft reach $a$ of belt 46 the fruit will remain impaled upon the pins.

As each transverse row of pins 88 passes vertically above the axis (spindles 49—50) of the drum 45 the arcuate leading ends 91 of the pins enter the orbit of the brushes 140 whereby the fruit immediately begins to slide upwardly upon the pins. Moreover, the fruit is simultaneously engaged by the stripping tines 126 for removal from the pins. Consequently, the fruit is automatically swept from and stripped off of the pins for gravitation onto the transverse belt 120 of the conveyor means E.

The fruit discharging from the belt 120 falls onto the lower end of the inclined elevator 160 for transfer to the chute 165 over which the fruit gravitates into a lug box supported on the platform 19.

While I have described my new prune picking apparatus in specific detail it will be apparent to those skilled in the art that this specific structure may be varied, modified or altered without departing from the spirit of my invention. I therefore desire to avail myself of all variations, modifications and alterations as fairly come within the scope of the appended claims.

What I claim as new and desire to protect by Letters Patent is:

1. In an apparatus for picking up fruit from the earth of the type including a carriage movable over the earth, traction means on said carriage for supporting the same for movement as aforesaid; the combination therewith of a pick-up unit comprising a drum pivotally mounted on said carriage a substantial distance above the earth, an endless belt trained around said drum and of greater circumferential size than said drum so as to have an earth engaging reach, a tensioning device for said pick-up unit comprising a frame pivotally mounted coaxially with said drum, a plurality of forward wheels on said frame for establishing a forward extremity for the earth engaging reach of said belt, a plurality of rearward wheels on said frame for establishing a rearward extremity for the earth engaging reach of said belt, said belt having a multitude of fruit impaling pins extending outwardly therefrom, and means for drivingly connecting said traction means and said drum for driving said belt at a speed whereby the pins thereon are relatively immobile with respect to earth when said pins are within the earth engaging reach thereof.

2. A pick-up unit for a prune picker of the type having a carriage movable over the earth, comprising a drum rotatably mounted on said carriage a substantial distance above the earth, tensioning means disposed rearwardly of said drum, an endless belt trained around said drum and tensioning means, said tensioning means including forwardly and rearwardly disposed presser wheels for establishing an earth engaging reach for said belt, means for mounting said rearwardly disposed wheels for movement relative to said forwardly disposed wheels for maintaining said belt in driving relation with said drum, a plurality of fruit impaling pins extending outwardly from said belt, each said pin having a forwardly curved extremity terminating in a point whereby as each pin turns about the forwardly disposed wheels to enter the earth engaging reach of said belt the pins in effect move axially into fruit engaged thereby to impale the same, and means for driving said drum at a predetermined speed whereby said pins while in the earth engaging reach of said belt remain relatively immobile with respect to the earth.

3. A pick-up unit of the type including a carriage movable over the earth comprising an endless belt, a drum supporting the forward extremity of said belt above the earth, tensioning means extending rearwardly of said belt and comprising a group of independently mounted spring-urged forward wheels bearing against the inner surface of said belt for establishing the forward extremity of an earth engaging reach thereof, a group of independently mounted spring-urged rearward wheels bearing against the inner surface of said belt for establishing a rearward extremity of the earth engaging reach thereof, means for yieldingly urging said rearward groups of wheels away from said forward group thereof for maintaining said belt in a tautened condition, a plurality of pins on said belt for impaling fruit when said pins are within the earth engaging reach of said belt, said independently mounted wheels yielding with said belt when an obstruction is engaged thereby and expanding the area of the belt engaged by said wheels when depressions in the earth register therewith.

4. A pick-up unit of the type including a carriage movable over the earth comprising an endless belt, a drum supporting the forward extremity of said belt above the earth, tensioning means extending rearwardly of said belt and comprising a group of independently mounted spring-urged forward wheels bearing against the inner surface of said belt for establishing the forward extremity of an earth engaging reach thereof, a group of independently mounted spring-urged rearward wheels bearing against the inner surface of said belt for establishing a rearward extremity of the earth engaging reach thereof, means for yieldingly urging said rearward groups of wheels away from said forward group thereof for maintaining said belt in a tautened condition, a plurality of pins on said belt for impaling fruit when said pins are within the earth engaging reach of said belt, said independently mounted wheels yielding with said belt when an obstruction is engaged thereby and expanding the area of the belt engaged by said wheels when depressions in the earth register therewith, and means for driving said drum at a predetermined speed whereby pins entering the earth engaging reach at the forward extremity thereof remain relatively immobile until leaving said reach at the rearward extremity thereof.

5. A pick-up unit of the type having a carriage movable over the earth comprising a drive drum rotatable on said carriage and above the surface of the earth, tensioning means pivotally mounted on said carriage so as to extend rearwardly of said drum, an endless belt of resilient material trained around said drum and said tensioning means to provide an earth engaging reach for said belt, a plurality of pins extending outwardly from said belt for engaging and impaling fruit when said pins enter the earth engaging reach of said belt, means for driving said drum and belt at a speed whereby said pins remain relatively immobile with respect to earth while within the earth engaging reach of said belt, said tensioning means including separate groups of fore and aft wheels, means mounting each said wheel for independent swinging movement, yieldable means connected to each said mounting means for urging the wheels associated therewith toward the inner surface of the earth engaging reach of said belt to thereby yield with said belt when the latter engages a protrusion on the surface of the earth and for pressing said resilient belt and the pins thereon into recesses in the earth in register with a particular wheel or wheels on said tensioning means for assuring impalement of fruit lodged in said recesses.

6. A pick-up unit of the type including a carriage movable over the earth comprising a driven drum rotatably mounted on said carriage out of contact with the earth, an endless belt trained around said driven drum, a plurality of fruit impaling pins extending outwardly from said belt, a frame including spaced arms mounted for pivotal movement on said carriage and extending rearwardly of said drum, a forward crossbar connecting said arms, a plurality of forward presser wheels pivotally mounted on said forward crossbar, means for urging said forward presser wheels against the inner surface of said belt to establish a forward extremity of an earth engaging reach thereof, a guideway on each said arm, a rolling block on each said guideway, a floating crossbar extending between each said rolling block, a plurality of rearward presser wheels pivotally mounted on said floating crossbar, means for urging said rearward presser wheels toward the inner surface of said belt for establishing a rearward extremity for the earth engaging reach thereof, and means for yieldingly urging said floating crossbar rearwardly of said forward crossbar for maintaining said endless belt in driving contact with said drum.

7. A pick-up unit of the type including a carriage movable over the earth comprising a driven drum rotatably mounted on said carriage out of contact with the earth, an endless belt trained around said driven drum, a plurality of fruit impaling pins extending outwardly from said belt, a frame including spaced arms mounted coaxially with said drum and extending rearwardly therefrom, a forward crossbar connecting said arms rearward of said drum, a plurality of presser wheels pivotally mounted on said forward crossbar, a guideway formed on each of said arms, a block mounted in each of said guideways for fore and aft movement, a floating crossbar extending between the blocks in each of said guideways, a plurality of rearward presser wheels pivotally mounted on said floating crossbar in staggered relation with respect to the forward presser wheels, an intermediate crossbar connecting said arms between said forward and rearward presser wheels, spring means between each of said forward and rearward presser wheels and said intermediate crossbar for urging said wheels toward earth to establish forward and rearward extremities of an earth engaging reach for said endless belt, means for yieldingly urging said blocks rearwardly in their guideways to maintain said rearward presser wheels in tensioning engagement with said endless belt, and means between the rearward extremities of said carriage and said arms for yieldingly urging the latter and the earth engaging reach of said belt toward the surface of the earth.

8. In a pick-up unit of the type including a carriage movable over the earth, an endless belt, flexible laterally and longitudinally thereof, said belt being mounted for conveying movement lengthwise of said carriage, belt tensioning means comprising two pluralities of individually spring pressed and upwardly displaceable rollers mounted interiorly of said belt and in rolling relation therewith, one plurality of said rollers being offset longitudinally from the other to establish an earth conforming reach of said belt, a plurality of pins mounted on said belt to extend outwardly therefrom for impaling fruit lying beneath the earth engaging reach thereof, whereby when said pins enter the earth engaging reach of said belt the pins will pierce any fruit disposed on the earth in their path of movement, and drive means mounted to move the earth engaging reach of said belt at a speed commensurate with the rate of movement of said carriage over the earth, and in a direction opposite to that of carriage movement.

9. Apparatus for picking up fruit from the earth comprising a carriage, traction means on said carriage in engagement with the earth, fruit pick-up means on said carriage comprising a drum pivotally mounted on said carriage above the earth, an endless belt of flexible material, of substantial width and of greater circumferential size than said drum, said belt being trained around said drum to have an earth engaging reach, a plurality of individually displaceable tensioning means mounted to extend downwardy from said drum and collectively engaging the inner surface of the earth engaging reach of said belt to urge it into conformation with the earth therebeneath, a plurality of pins mounted on said belt to project outwardly therefrom for impaling fruit lying on the surface of the earth beneath the earth engaging reach of said belt, and means drivingly connecting said traction means and said belt to move the ground engaging reach of said belt at a speed commensurate with and in a direction opposite to the travel of said carriage to retain the ground engaging reach of the belt substantially stationary relative to the earth therebeneath during forward travel of the carriage.

10. Apparatus for picking up fruit from the earth comprising a carriage, traction means on said carriage in engagement with the earth, fruit pick-up means on said carriage comprising a drum pivotally mounted above the earth, an endless belt of flexible material, of substantial width and of greater circumferential size than said drum, said belt being trained around said drum to have an earth engaging reach, a plurality of individually displaceable tensioning means mounted to extend downwardly from said drum and collectively engaging the inner surface of the earth engaging reach of said belt to urge it into conformation with the earth therebeneath, a plurality of pins mounted on said belt to project outwardly therefrom for impaling fruit lying on the surface of the earth beneath the earth engaging reach of said belt, means drivingly connecting said traction means and said belt to move the ground engaging reach of said belt at a speed commensurate with and in a direction opposite to the travel of said carriage to retain the ground engaging reach of the belt substantially stationary relative to the earth therebeneath during forward travel of the carriage, and fruit take-off means mounted adjacent said drum and moving oppositely relative to the direction of belt travel over said drum, said fruit take-off means being positioned to engage fruit impaled on said pins and to remove the impaled fruit therefrom.

11. Apparatus for picking up fruit from the earth comprising a carriage, traction means on said carriage in engagement with the earth, fruit pick-up means on said carriage comprising a drum pivotally mounted above the earth, an endless belt of flexible material and of substantial width and of greater circumferential size than said drum, said belt being trained around said drum to have an earth engaging reach, a tensioning means support frame pivotally mounted coaxially of said drum and extending downwardly therefrom, a plurality of individually displaceable tensioning means mounted on said tensioning means support frame and collectively engaging the inner surface of the earth engaging reach of said belt to urge it into conformation with the earth therebeneath, a plurality of pins mounted on said belt to project outwardly therefrom for impaling fruit lying on the surface of the earth beneath the earth engaging reach of said belt, and means drivingly connecting said traction means and said belt to move the ground engaging reach of said belt at a speed commensurate with and in a direction opposite to the travel of said carriage to retain the ground engaging reach of the belt substantially stationary relative to the earth therebeneath during forward travel of the carriage.

12. Apparatus for picking up fruit from the earth comprising a carriage, traction means on said carriage in engagement with the earth, fruit pick-up means on said carriage comprising a drum pivotally mounted above the earth, an endless belt of flexible material, of greater circumferential size than said drum, said belt being trained around said drum to have an earth engaging reach, means drivingly connecting the traction means and the belt to move the ground engaging reach of the belt at a speed commensurate with and in a direction opposite to the travel of the carriage to retain the ground engaging reach of the belt substantially stationary relative to the earth therebeneath during forward travel of the carriage, belt tensioning means mounted beyond said drum and pivotally supported coaxiallly of said drum and to engage the inner surface of the earth engaging reach of said belt to urge it into conformation with the earth therebeneath, and a plurality of pins mounted on said belt to project outwardly therefrom, the outer end portions of said pins being bent forwardly relative to the direction of belt travel around said drum for impaling fruit lying on the surface of the earth beneath the earth engaging reach of said belt.

13. Apparatus for picking up fruit from the earth comprising a carriage, traction means on said carriage in engagement with the earth, fruit pick-up means on said carriage comprising a drum pivotally mounted above the earth, an endless belt of flexible material, of greater circumferential size than said drum, said belt being trained around said drum to have an earth engaging reach, means drivingly connecting the traction means and the belt to move the ground engaging reach of the belt at a speed commensurate with and in a direction opposite to the travel of the carriage to retain the ground engaging reach of the belt substantially stationary relative to the earth therebeneath during forward travel of the carriage, belt tensioning means mounted to engage the inner surface of the earth engaging reach of said belt to urge it into conformation with the earth therebeneath, a plurality of rows of pins mounted on said belt to project outwardly therefrom, the outer end portions of said pins being bent forwardly relative to the direction of belt travel around said drum for impaling fruit lying on the surface of the earth beneath the earth engaging reach of said belt, a plurality of fruit stripping tines mounted to extend tangentially of a portion of the belt overlying the drum in a direction opposite to the direction of belt travel, past said pins, said tines being located between adjacent rows of said pins, a rotary brush mounted in peripheral engagement with the pins in the region of the tangency of said tines to said belt, and drive means mounted to rotate the brush to move its periphery oppositely to the direction of belt travel at the area of said belt and said brush engagement.

14. In a fruit pick-up unit having a carriage movable over the earth, an endless flexible belt mounted with a reach thereof in engagement with the earth, two pluralities of tensioning means mounted in longitudinally spaced relation along the earth engaging reach of the belt to exert downward earth engaging pressure on said belt, each unit of each plurality of said tensioning means being individually upwardly displaceable, biasing means connected to each unit of each plurality of said tensioning means to control the downward pressure thereof on the earth engaging reach of said belt to urge it into conformation with the earth therebeneath, drive means mounted to drive the belt to move its earth engaging reach at a speed commensurate with and in a direction opposite to the travel of the carriage over the earth, a plurality of fruit impaling pins mounted on said belt to extend outwardly therefrom, the end portion of each pin being bent forwardly relative to the direction of belt travel, and terminating in a point whereby said pins approach the earth engaging reach of said belt with their points directed axially toward the surface of the earth to pierce fruit disposed in their path of movement.

WALTER WIEBE.

References Cited in the file of this patent
UNITED STATES PATENTS

| Number | Name | Date |
|---|---|---|
| 1,222,878 | Lint | Apr. 17, 1917 |
| 1,317,927 | Lint | Oct. 7, 1919 |
| 1,650,796 | Kellogg | Nov. 29, 1927 |
| 1,921,651 | Behling | Aug. 8, 1933 |
| 2,155,543 | Grignolo | Apr. 25, 1939 |
| 2,573,210 | Madsen | Oct. 30, 1951 |
| 2,599,715 | Lepper | June 10, 1952 |